United States Patent [19]
De Filippo

[11] Patent Number: 5,819,596
[45] Date of Patent: Oct. 13, 1998

[54] STEERING WHEEL FOR MOTOR VEHICLES

[75] Inventor: Emilio De Filippo, Bruzolo, Italy

[73] Assignee: Gestind-M.B. "Manifattura di Brusolo" S.p.A., Torino, Italy

[21] Appl. No.: 763,080

[22] Filed: Dec. 10, 1996

[30] Foreign Application Priority Data

Jul. 16, 1996 [IT] Italy ................................ TO96A0613

[51] Int. Cl.$^6$ ................................................ B62D 1/04
[52] U.S. Cl. ................................................................ 74/552
[58] Field of Search ..................... 74/552, 558; 29/894.1

[56] References Cited

FOREIGN PATENT DOCUMENTS

| | | | |
|---|---|---|---|
| 2502092 | 9/1982 | France | 74/552 |
| 2577185 | 8/1986 | France | 74/552 |
| 2583699 | 12/1986 | France | 74/552 |
| 3827794 | 3/1989 | Germany | 74/552 |
| 58-63572 | 4/1983 | Japan | 74/552 |
| 63-240464 | 10/1988 | Japan | 74/552 |
| 2-254055 | 10/1990 | Japan | 74/552 |

*Primary Examiner*—Vinh T. Luong
*Attorney, Agent, or Firm*—Sughrue, Mion, Zinn, Macpeak & Seas, PLLC

[57] ABSTRACT

A steering wheel for motor vehicles comprising a metal framework formed by a rim and by substantially cylindrical wire rods interconnecting the rim with a central hub. For connecting the wire rods and the rim substantially V-shaped metal sleeves are provided, each having a first tubular branch for attachment on the rim and a second tubular branch for attachment of the corresponding wire rod, which is rigidly joined to the first branch through a double integral bracing wall.

6 Claims, 2 Drawing Sheets

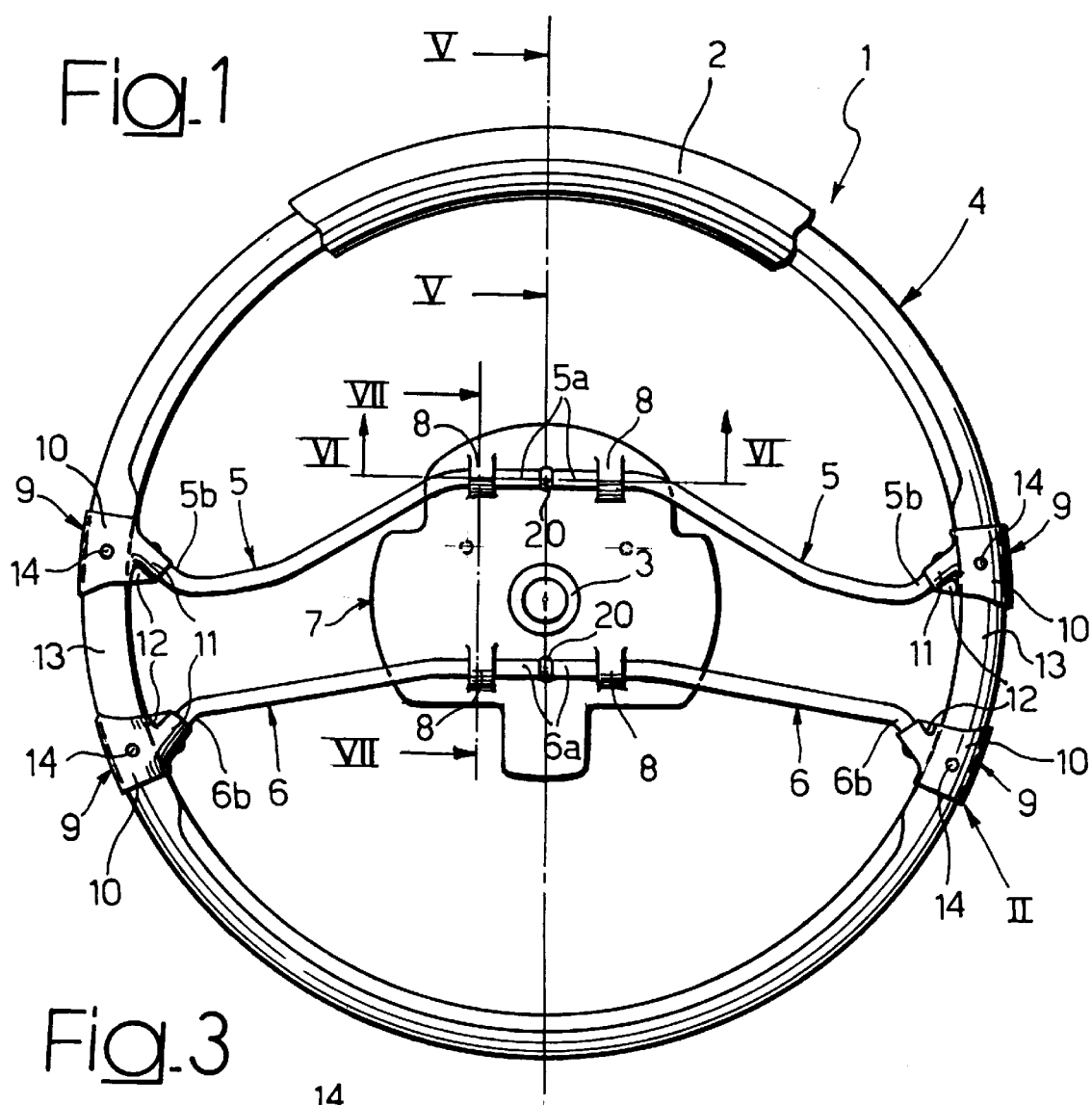
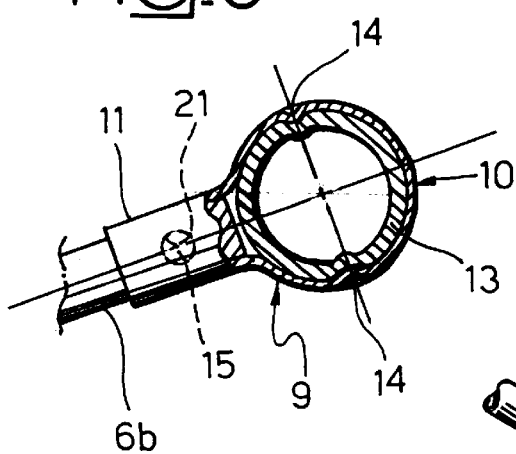
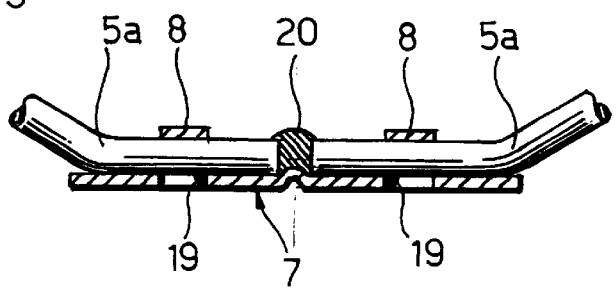

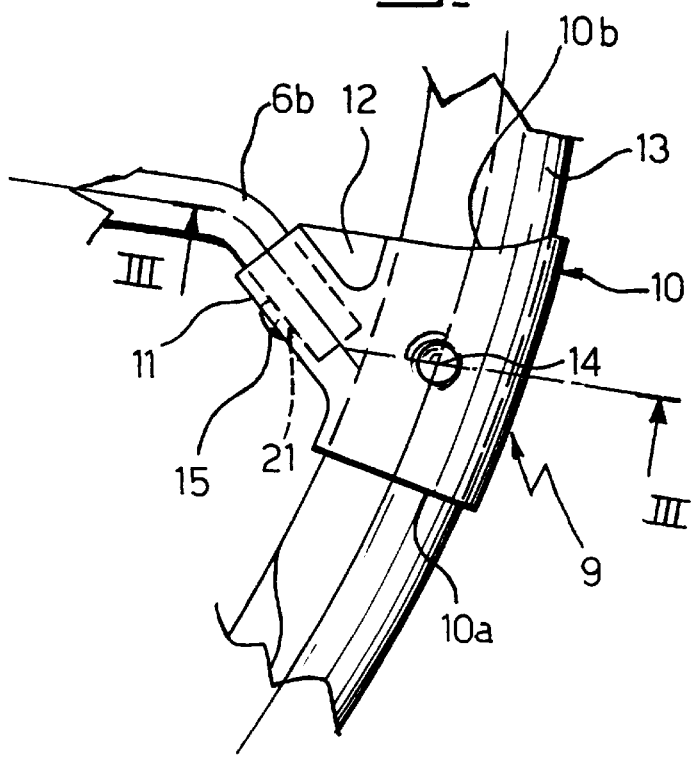
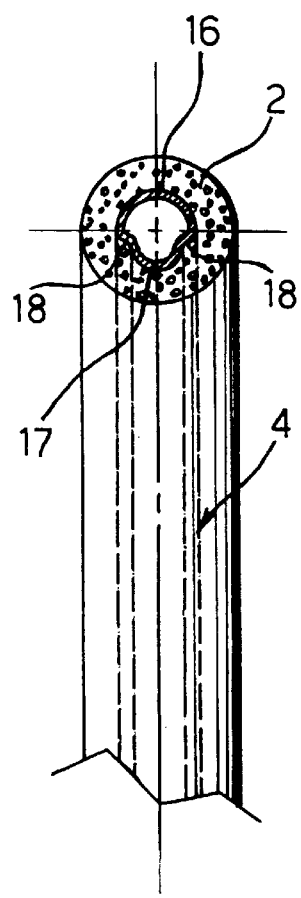
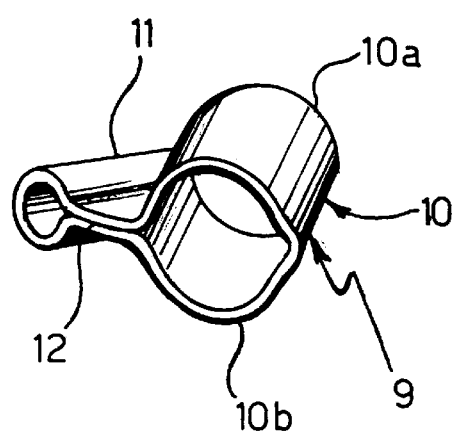
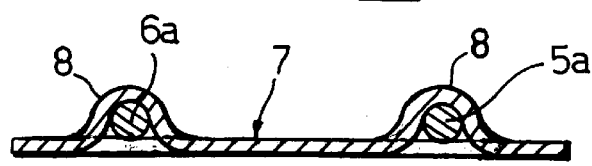

STEERING WHEEL FOR MOTOR VEHICLES

BACKGROUND OF THE INVENTION

The present invention is related to steering wheels, particularly for motor vehicles, comprising a central hub and a framework formed by a rim and substantially radial spokes interconnecting the rim and hub.

From document FR-A-2553730 a steering wheel of the above-referenced type is known, wherein the spokes are formed by at least a pair of substantially cylindrical metal wire rods and wherein substantially V-shaped metal sleeves are provided for connecting said rods and rim, each sleeve having a first tubular branch for attachment on the rim and a second tubular branch departing obliquely from the proximity of one end of the first branch and within which one end of the corresponding rod is engaged.

SUMMARY OF THE INVENTION

The object of the present invention is to improve a steering wheel of the above-referenced type, with particular reference to a remarkably increased strength of the framework and namely of the connections between the rods and rim, at the same time with a simple and cheap construction of the steering wheel, adapted to be easily carried out by means of automatic equipment.

According to the invention, this object is achieved essentially by virtue of the fact that the second branch of each of said sleeves is rigidly joined to the other end of the first branch through an integral double bracing wall.

Each of said sleeves is conveniently formed by a one-piece sheet metal body drawn from a flat ring.

According to a preferred embodiment of the invention, two pairs of wire bars are provided between the rim and hub, to which two respective pairs of said sleeves are associated, the ends facing towards the rim of the bars of each pair being diverging from each other, and said second tubular branches of each pair of said sleeves being converging towards each other.

The second tubular branch of each sleeve is conveniently formed, on the side opposite to said integral double bracing wall, with a hole housing a spot welding for rigid connection thereof to the corresponding end of the respective bar, and the first tubular branch of each sleeve is rigidly secured to the rim through a pair of juxtaposed crimpings.

Moreover, according to a preferred embodiment of the invention, the hub is carried by a plate formed with integral eyelet members into which the ends of said rods opposite to the rim are fixed by welding.

BRIEF DESCRIPTION OF THE DRAWINGS

The invention will now be disclosed in detail with reference to the accompanying drawings, purely provided by way of non-limiting example, in which:

FIG. 1 is a fragmentary front elevational view of a steering wheel for motor vehicles according to the invention, FIG. 2 shows in enlarged scale the particular shown by arrow II in FIG. 1, FIG. 3 is a cross-sectioned view along line III—III of FIG. 1, FIG. 4 is a perspective view of the particular shown in FIG. 2, FIG. 5 is a cross-sectioned and enlarged view along line V—V of FIG. 1, FIG. 6 is a sectioned and enlarged view along line VI—VI of FIG. 1, and FIG. 7 is a sectioned and enlarged view along line VII—VII of FIG. 1.

DETAILED DESCRIPTION OF THE INVENTION

Referring to the drawings, a steering wheel according to the invention essentially comprises a metal framework 1, a cover pad made of foamed plastic material partially shown as 2, which is overmoulded on the framework 1, and a central hub 3 connecting the steering wheel to a steering shaft, in a way known per se.

The metal framework 1 is formed by a substantially circular rim 4 and by two pairs of metal wire rods 5, 6 rigidly connecting substantially diametrically opposite areas 13 of the rim 4 with the hub 3. The hub 3 is carried by a plate 7 which is arranged in a general plane forwardly offset with respect to the plane of the rim 4 and which is formed, at opposite sides of the hub 3, with two pairs of integral C-eyelet members 8 into which the inner ends 5a, 6a of the rods 5, 6 are secured by welding.

As it can be better seen in FIGS. 6 and 7, each end 5a, 6a is fitted trough a respective eyelet 8 and is rigidly fixed thereto by means of one rear welding spot 19. The ends 5a of the two rods 5 and the ends 6a of the two rods 6 are further rigidly joined to each other and to the plate 7 by respective front welding spots 20.

The outer ends 5b, 6b of the two rods 5, 6 are rigidly connected to the rim 4, such as explained in detail in the following, by means of respective metal sleeves 9, one of which is shown in better detail in FIG. 4. Each of these sleeves 9, all identical to one another, is formed by a one-piece sheet metal body, drawn starting from a flat ring, and has a generally V-like shape with a first tubular branch 10 having a greater-diameter circular cross-section and with a curved design whose curvature radius is corresponding to that of the rim 4, and a second tubular branch 11 with a smaller-diameter circular cross-section. The second tubular branch 11 departs obliquely, with an angle of about 45°, from the proximity of one end 10a of the first tubular branch 10. According to the invention, the second branch 11 is rigidly connected to the other end 10b of the first branch 10 by means of a double integral bracing wall 12. On the side opposite to this double integral bracing wall 12, the second tubular branch 11 has a through hole 21.

The first branches 10 of the sleeves 9 are fitted onto the corresponding portions 13 of the rim 4, having a complementary circular cross-section, and are rigidly secured thereto by means of respective opposite crimpings 14. The positioning of the pair of sleeves 9 corresponding to the right ends 5b, 6b with respect to FIG. 1 on one side, and on the other side that of the pair of sleeves 9 corresponding to the left ends 5b, 6b of the rods 5, 6 on the other side, is such that the second branches 11 of the sleeves 9 of each pair are converging towards the interior of the rim 4. In other words, the sleeves 9 of each pair are fitted and secured onto the rim 4 in mutually reversed positions.

Correspondingly, the right ends 5b, 6b on one side, and the left ends 5b, 6b of the rods 5, 6 on the other side are bent in a mutually diverging fashion, with an angle corresponding to that of the second branches 11 of the respective sleeves 9 within which these ends 5b, 6b are fitted. Fixing of each end 5b, 6b and the respective sleeve 9 is performed by means of one welding spot 15 applied within the corresponding hole 21 of the tubular branch 11 thereof.

Accordingly, an extremely rigid and sturdy connection is obtained, in particular due to the provision of the bracing walls 12 of the sleeves 9, between the hub 3 and the rim 4, through the rods 5, 6.

With the exception of the two portions 13 of circular cross-section, the rim 4 is formed along the entire perimeter thereof with a curvilinear non-circular cross-section which, as shown in detail in FIG. 5, is formed by two opposite convex portions 16, 17 substantially shaped like round arches with longer and shorter radius, respectively, and by two concave portions 18 which interconnect the convex portions 16 and 17. By virtue of this design, the rim 4 is globally provided with an increased torsional and flexional strength, even with a reduced thickness wall, and at the same time it warrants a steady and firm anchoring thereon of the foamed plastic material cover pad 2.

Naturally the details of construction and the embodiments may be widely varied with respect to what has been disclosed and illustrated, without thereby departing from the scope of the present invention, such as defined in the appended claims. Thus, for instance, the bars 5 and 6 of each pair might be formed in one piece, and connection between the sleeves 9 and the rim 4 might also be made by spot welding.

What is claimed is:

1. A steering wheel for motor vehicles including a central hub and a framework formed by a rim and two substantially radial spokes interconnecting said rim and hub, wherein said spokes are formed by at least one pair of substantially cylindrical metal wire rods having respective outer and inner ends and wherein substantially V-shaped metal sleeves are provided for connecting said rods and said rim therebetween, each sleeve comprising a first tubular branch for attachment on the rim having a first and a second end, and a second tubular branch departing obliquely from the proximity of said first end of said first branch and within which the outer end of the corresponding rod is engaged, and further comprising integral double bracing wall means rigidly joining said second branch to said second end of the first branch of each of said sleeves, wherein each of said sleeves is formed by a one-piece sheet metal body drawn from a flat ring.

2. Steering wheel according to claim 1, wherein:

two pairs of rods are provided between said rim and said hub, to which two respective pairs of said sleeves are associated, said outer ends of said rods of each pair are diverging from each other, said second tubular branches of each pair of said sleeves are converging towards each other.

3. Steering wheel according to claim 2, wherein said second tubular branch of each sleeve is formed, on the side opposite to said integral double bracing wall, with a hole housing a welding spot for rigid connection of said second tubular branch to the said outer end of the respective rod.

4. Steering wheel according to claim 2, wherein said first tubular branch of each sleeve is rigidly secured to the rim through a pair of juxtaposed crimpings.

5. Steering wheel according to claim 2, comprising a plate carrying said hub and formed with integral eyelet means into which said inner ends of said rods are fixed by welding spots.

6. Steering wheel according to claim 1, wherein said rim is formed in correspondence of said sleeves with a circular cross-section, and is formed along the remaining part thereof with a non-circular curvilinear cross-section including two substantially round-arch convex portions having different radiuses and two concave portions interconnecting said convex portions.

\* \* \* \* \*